(12) United States Patent
Valdés Colina

(10) Patent No.: US 11,258,239 B2
(45) Date of Patent: Feb. 22, 2022

(54) CABLE TRAY SECTION

(71) Applicant: VALDINOX, S.L., Santander (ES)

(72) Inventor: Justo Manuel Valdés Colina, Santander (ES)

(73) Assignee: VALDINOX, S.L., San Miguel de Meruelo (ES)

( * ) Notice: Subject to any disclaimer, the term of this patent is extended or adjusted under 35 U.S.C. 154(b) by 163 days.

(21) Appl. No.: 16/757,239

(22) PCT Filed: Oct. 20, 2017

(86) PCT No.: PCT/ES2017/070705
§ 371 (c)(1),
(2) Date: Apr. 17, 2020

(87) PCT Pub. No.: WO2019/077173
PCT Pub. Date: Apr. 25, 2019

(65) Prior Publication Data
US 2021/0126440 A1 Apr. 29, 2021

(51) Int. Cl.
*H02G 3/00* (2006.01)
*H02G 3/04* (2006.01)
*H02G 3/06* (2006.01)

(52) U.S. Cl.
CPC ......... *H02G 3/0443* (2013.01); *H02G 3/0608* (2013.01)

(58) Field of Classification Search
CPC .......................... H02G 3/0443; H02G 3/0608
See application file for complete search history.

(56) References Cited

U.S. PATENT DOCUMENTS

| 3,024,301 A | 3/1962 | Walch |
| 2005/0040295 A1 | 2/2005 | Sinkoff |

(Continued)

FOREIGN PATENT DOCUMENTS

| EP | 2733803 | 5/2014 |
| EP | 2816687 | 12/2014 |

(Continued)

OTHER PUBLICATIONS

International Search Report and Written Opinion in corresponding PCT/ES2017/070705, dated Jul. 3, 2018 (English translation attached).

(Continued)

*Primary Examiner* — Pete T Lee
(74) *Attorney, Agent, or Firm* — Hovey Williams LLP

(57) ABSTRACT

The present invention relates to a cable tray section which allows being successively coupled to another tray section (1) having similar features, without needing accessories or angle requirements on the horizontal plane, comprising longitudinal metal wires (10); U-shaped transverse metal wires (20); at least one anchoring element (30) installed between the longitudinal wires (10), attached to the last and next to last transverse wires (20), and comprising a single metal wire (31) close to the next to last transverse wire (20); and a pair of straight sections (32, 32') parallel to one another; where the straight sections (32, 32') project with respect to the last transverse wire (20), forming a rectangular section (33) perpendicular to the straight sections (32, 32'), such that there is established a free space (40) between the last transverse wire (20) and said rectangular section (33); said space (40) having a dimension corresponding to the thickness of a transverse wire (20).

7 Claims, 6 Drawing Sheets

(56) References Cited

U.S. PATENT DOCUMENTS

2010/0126951 A1* 5/2010 Winn ................... H02G 3/0443
                                                        211/133.5
2015/0021085 A1* 1/2015 Bethoule ................. H02G 1/04
                                                        174/40 R
2017/0104319 A1* 4/2017 Ojerstav .............. H02G 3/0443

FOREIGN PATENT DOCUMENTS

| EP | 3139460 | 3/2017 |
| ES | 1076189 | 2/2012 |
| ES | 1077448 | 7/2012 |
| ES | 2575408 | 6/2016 |

OTHER PUBLICATIONS

International Preliminary Report on Patentability in corresponding PCT/ES2017/070705, dated Jan. 23, 2020.
Office Action in co-pending U.S. Appl. No. 16/757,099, dated Jul. 7, 2021.
Office Action in co-pending U.S. Appl. No. 16/757,099, dated Mar. 23, 2021.
International Search Report and Written Opinion in PCT/ES2017/070704, dated Jul. 3, 2018(English translation attached), from co-pending U.S. Appl. No. 16/757,099.
International Preliminary Report on Patentability in PCT/ES2017/070704, dated Jan. 27, 2020, from co-pending U.S. Appl. No. 16/757,099.

* cited by examiner

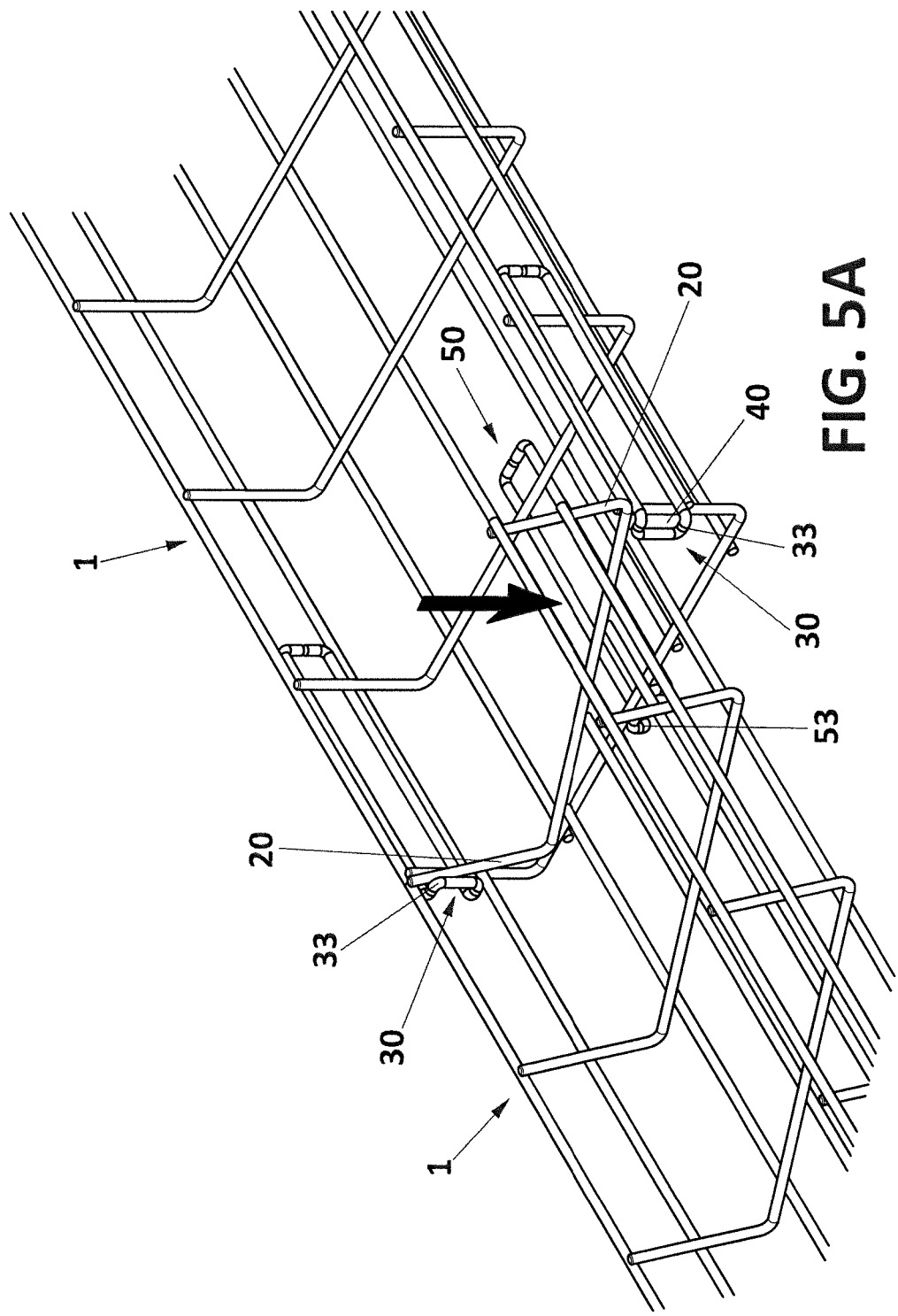

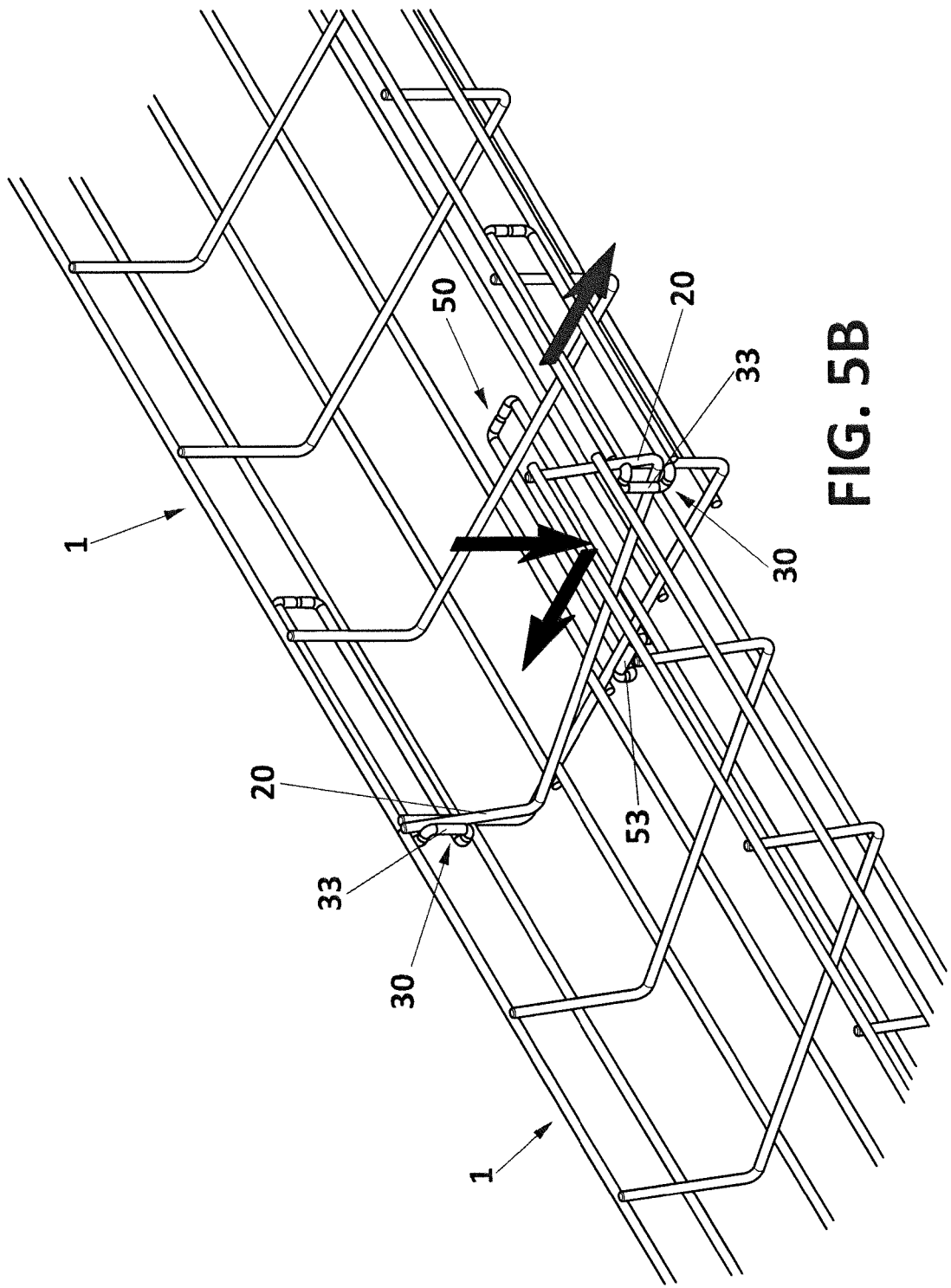

CABLE TRAY SECTION

RELATED APPLICATIONS

This application is the U.S. National Stage of International Patent Application No. PCT/ES2017/070705, filed Oct. 20, 2017, which is hereby incorporated by reference in its entirety.

OBJECT OF THE INVENTION

The present invention relates to the electrical field, and more specifically to devices or apparatus for installing and supporting electrical lines, particularly by means of wire cable trays.

The main object of the present invention is a cable tray section that can be successively coupled to another tray section having similar features, thereby forming a cable support duct, without requiring any additional tool or accessory, all of which furthermore takes up minimal space and considerably helps the operator in installation tasks.

BACKGROUND OF THE INVENTION

Different attachment models for forming wire trays, which are intended for supporting electrical cables, are known today. More specifically, anchoring systems based on the use of zip ties installed between every two tray sections to keep the transverse metal wires attached with lugs are known.

On the other hand, other systems keeping the base and the walls of two contiguous tray sections secured by means of jointly securing the last transverse metal wire with a plate, a screw and the complementary nut are known. However, these systems have the enormous drawback that in addition to requiring the installation of several accessories and components, they also require considerable precision in the assembly of the tray, which is generally done at the installation site, with the installer being on a ladder in an uncomfortable position and/or with little available space.

Taking these problems into account, anchoring systems for tray sections without additional devices or accessories with sections that are coupled to one another have been designed. In this sense, technical solutions are known in which the tray sections have different ends, the height and the width of one of such sections are tapered with respect to the other one, and the largest end has at least two transverse metal wires that are located very close to one another for introducing the transverse metal wire of the smallest end between these metal wires in the next tray section. The drawback of trays of this type is the work, skill and expertise required for making all the bends in the smallest end, which further entails the operator taking longer to complete the installation.

An example of anchors of this type is described in European patent translation ES2575408 T3, belonging to the same proprietor as the present invention. However, the fundamental problem of anchors of this type is the need for a certain working angle ($\alpha$), like that shown in FIG. 1, between every two tray sections to be attached. So in most cases there is not enough space to be able to operate and work suitably, so it is impossible to obtain said required working angle ($\alpha$), and accordingly the coupling between two tray sections is impossible.

Furthermore, European patent application EP2816687 A1 relates to a cable-tray section with transverse locking, a cable tray comprising such sections and a method for manufacturing the same.

DESCRIPTION OF THE INVENTION

The technical problem discussed above is solved by means of the present invention by providing a cable tray section particularly configured for being successively attached and/or coupled to another contiguous tray section having similar features, without needing additional accessories or any requirements with respect to the working angles on the horizontal plane. This favors a quick, comfortable and simple assembly of several tray sections to form a cable support duct, which is particularly useful in small spaces, while at the same time entailing a simple and cost-effective manufacture.

More specifically, the tray section of the invention comprises: longitudinal metal wires; U-shaped transverse metal wires attached to the longitudinal metal wires; at least one anchoring element installed between the longitudinal metal wires, on the same vertical plane as the side walls of the tray section, where said anchoring element is attached to the last and next to last transverse metal wires, as will be explained below in detail.

In turn, the aforementioned anchoring element comprises: a single metal wire close to the next to last transverse metal wire; and a pair of straight sections parallel to one another; where said straight sections of the anchoring element project outwardly with respect to the last transverse metal wire of the tray section, forming a rectangular section perpendicular to the straight sections, such that there is established a free space located between the last transverse metal wire and the rectangular section; and where said space has a dimension corresponding to the thickness of a transverse metal wire of the tray section.

It should be pointed out at this point that when reference is made to the "last" transverse metal wire, reference is being made here to the transverse wire located closest to the coupling region between two tray sections, i.e., the last transverse is the wire located closest to the aforementioned rectangular sections of one and the same tray section.

Preferably, the rectangular sections of the side walls of the tray section are opposite one another, symmetrically arranged with respect to the longitudinal axis of the tray section. This particular feature provides an advantageous dual effect, namely, on one hand it allows defining a recess towards the center of the tray section, having certain flexibility and on which a given force can be applied so as to allow the insertion of the corresponding transverse metal wire, as will be explained below; and on the other hand it allows assuring a fixed, secure and stable position of the two tray sections once they are attached and assembled, without there being unwanted sliding or movements, and therefore preventing any possible decoupling between both tray sections.

Furthermore, according to a preferred embodiment of the invention, it has been provided that the tray section herein described can additionally comprise at least one additional anchoring element, located on the horizontal plane of the lower wall of the tray section, and attached to the last and next to last transverse metal wires. Preferably, said additional anchoring element is structurally similar to the anchoring element of the side walls of the tray section.

DESCRIPTION OF THE DRAWINGS

To complement the description that is being made and for the purpose of helping to better understand the features of the invention according to a preferred practical embodiment thereof, a set of drawings is attached as an integral part of said description in which the following has been depicted with an illustrative and non-limiting character:

FIGS. 5A, 5B, 5C show the sequence for coupling and attaching two tray sections, without needing a working angle on the horizontal plane.

PREFERRED EMBODIMENT OF THE INVENTION

A preferred embodiment is described below in reference to the aforementioned drawings, without limiting or reducing the scope of protection of the present invention.

Figure 2:
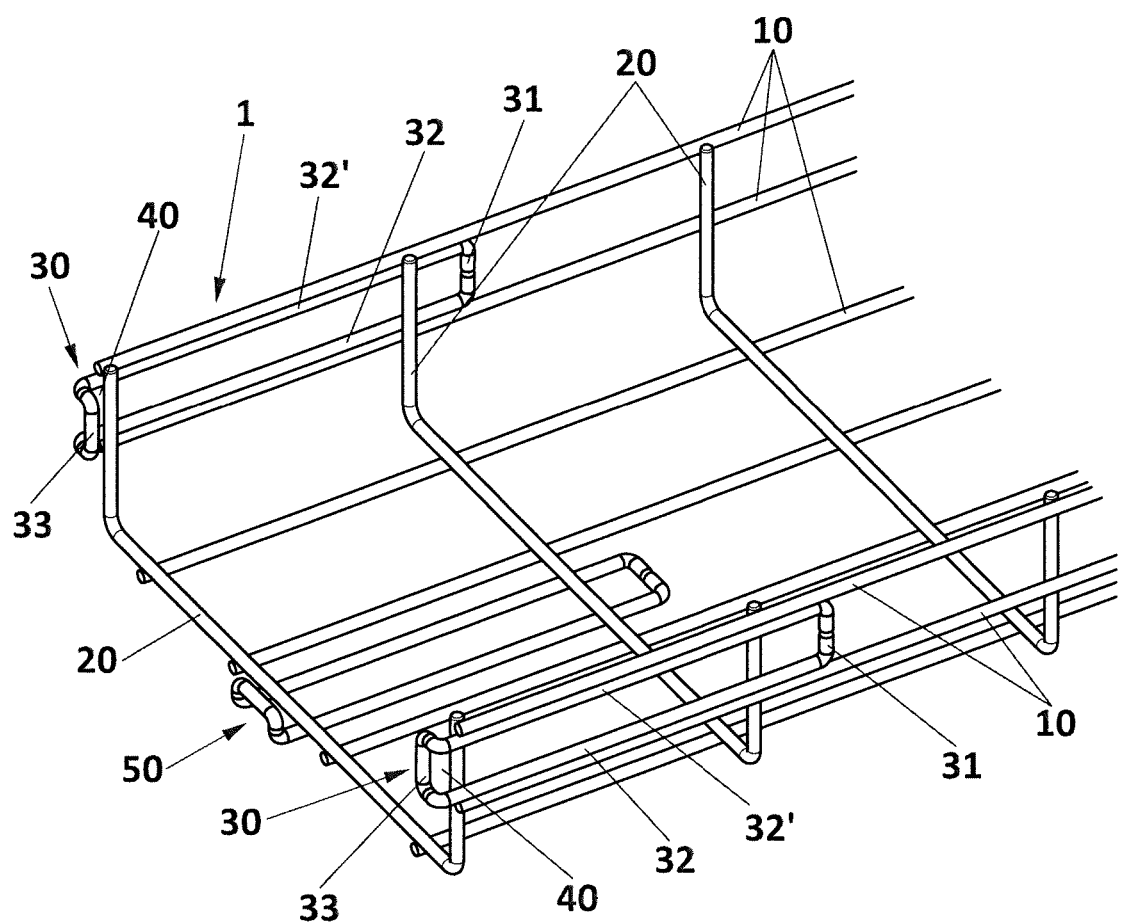
FIG. 2 shows a perspective view of the tray section, particularly of its front region, according to a preferred embodiment of the invention.

FIG. 2 shows the cable tray section (1) object of the invention, which comprises in the present embodiment:
longitudinal metal wires (10);
U-shaped transverse metal wires (20) attached to the longitudinal metal wires (10);
a pair of anchoring elements (30) installed between the longitudinal metal wires (10), on the same vertical plane as the side walls of the tray section (1); where said anchoring elements (30) are attached to the last and next to last transverse metal wires (20); and where each anchoring element (30) comprises a single metal wire (31) close to the next to last transverse metal wire (20), and a pair of straight sections (32, 32') parallel to one another; and
an additional anchoring element (50), located on the horizontal plane of the lower wall of the tray section (1), and likewise attached to the last and next to last transverse metal wires (20).

As can clearly be seen in FIG. 2, the straight sections (32, 32') of the anchoring elements (30) project outwardly with respect to the last transverse metal wire (20) of the tray section (1), establishing a rectangular section (33) perpendicular to said straight sections (32, 32'). A free space (40), shown in FIGS. 2 and 4, located between the last transverse metal wire (20) and the rectangular sections (33) is thereby established, said space (40) having a dimension corresponding to the thickness of a transverse metal wire (20) of the tray section (1).

Figure 3:
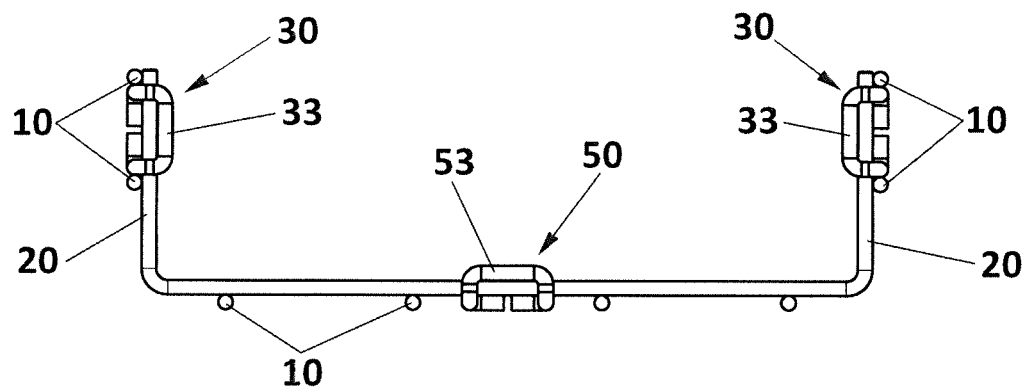
FIG. 3 shows a front view of the tray section of FIG. 2, where the particular configuration of the rectangular sections of the anchoring elements can be seen.

More particularly, as shown in FIG. 3, the rectangular sections (33) of the side walls of the tray section (1) are opposite one another, arranged symmetrically with respect to the longitudinal axis (A-A') of the tray section (1). This is not a trivial or random feature but rather seeks to meet two well-identified objectives:

a) to define a recess having certain flexibility and on which recess certain force must be applied so as to allow the insertion of the corresponding transverse metal wire (20);

b) to assure a fixed, secure and stable position of the two tray sections (1) once they are attached, without the possibility of unwanted sliding or movements thereof, and therefore preventing possible decoupling.

Figure 4:
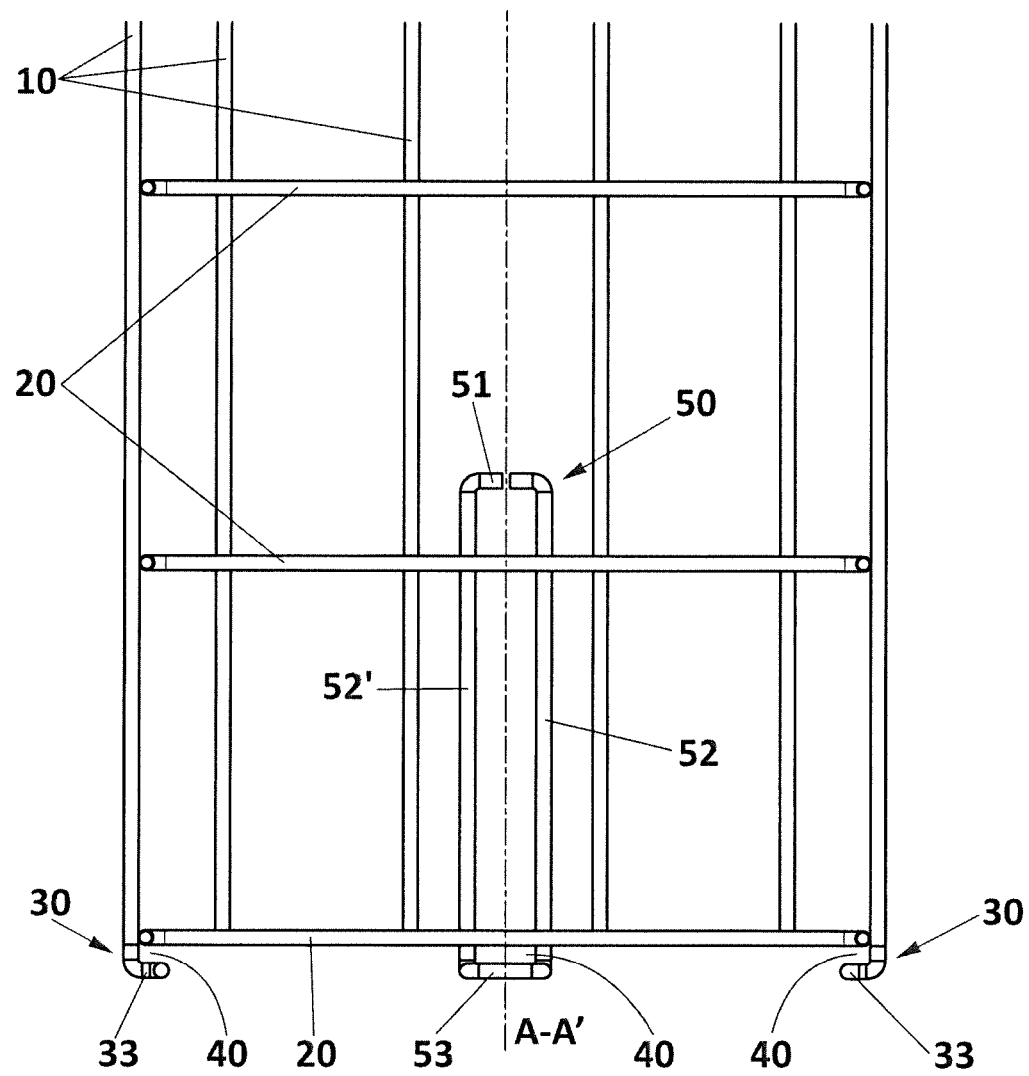
FIG. 4 shows a plan view of the tray section of FIG. 2, particularly, where the additional anchoring element located in the longitudinal axial axis A-A', as well as the free spaces existing between the last transverse metal wire and the corresponding rectangular sections, can be observed.

On the other hand, as observed in FIGS. 2 and 4, the additional anchoring element (50) is installed on the longitudinal axis of symmetry (A-A) of the tray section (1). This particularity will allow adding another fixing and securing element for the attachment between the two tray sections (1) to be coupled to one another, as shown in the sequential views of FIGS. 5A to 5C.

More specifically, according to the present example the additional anchoring element (50) is structurally similar to the anchoring elements (30) of the side walls of the tray section (1), said additional anchoring element (50) comprising a single metal wire (51) close to the next to last transverse metal wire (20), and a pair of straight sections (52, 52') parallel to one another.

In this regard, it can be seen in FIG. 4 that one of the straight sections (52') of the additional anchoring element (50) projects with respect to the last transverse metal wire (20) of the tray section (1), likewise establishing a rectangular section (53) perpendicular to the straight sections (52, 52'), said rectangular section (53) being oriented in this case in the horizontal direction, as reflected in FIG. 3. Similarly, the foregoing allows creating a free space (40) located between the last transverse metal wire (20) and said rectangular section (53). Likewise, said space (40) has a dimension corresponding to the thickness of a transverse metal wire (20) of the tray section (1), which will allow perfect coupling and attachment between two contiguous tray sections (1).

For the sake of clarity, that transverse metal wire located furthest to the left, as observed in FIG. 2, and coinciding with the one located closest to the rectangular sections (33, 53) of the anchoring elements (30, 50), must be understood as "last" transverse metal wire (20).

According to this embodiment, the metal wires (31, 51) of their corresponding anchoring elements (30, 50) are bent into a completely closed configuration at both their proximal end and distal end, "proximal end" being understood as the end closest to the last transverse metal wire (20), and "distal end" being understood as the end of the anchoring elements (30, 50) closest to the next to last transverse metal wire (20), as depicted in FIGS. 2 and 4. This favors a safer finishing of the anchoring elements, without sharp edges or ridges that can cause some type of catching, cut or accident during the installation tasks performed by the operator in question.

Nevertheless, according to another preferred embodiment not shown in the drawings, it has been provided that the tray section (1) herein described can comprise two additional anchoring elements (50), installed equidistantly from one another with respect to the longitudinal axis of symmetry (A-A) of the tray section (1).

Figure 1:
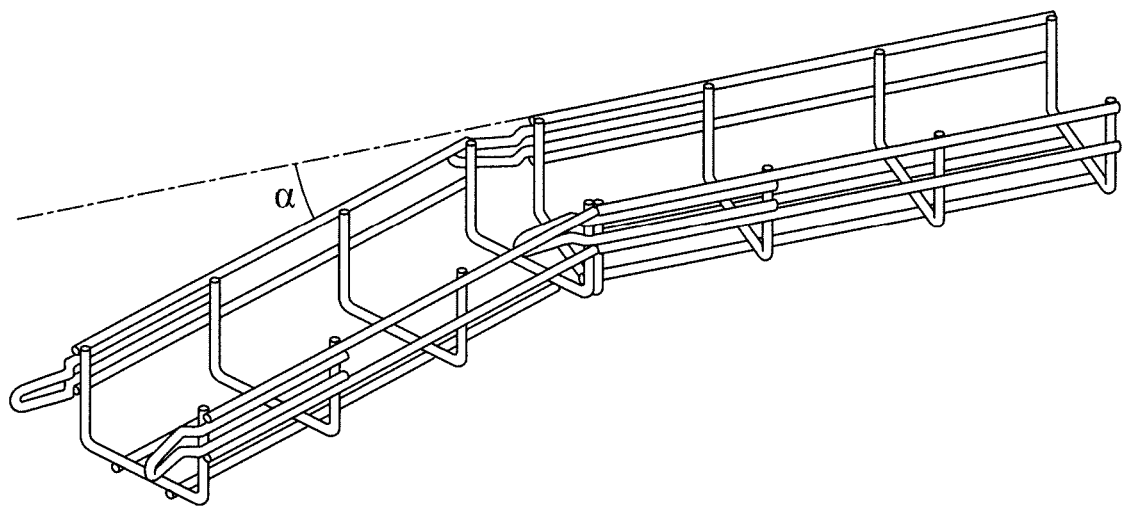
FIG. 1 shows an anchoring system according to the current state of the art, where the working angle required for achieving the attachment between two tray sections can be seen.
Figure 5C:
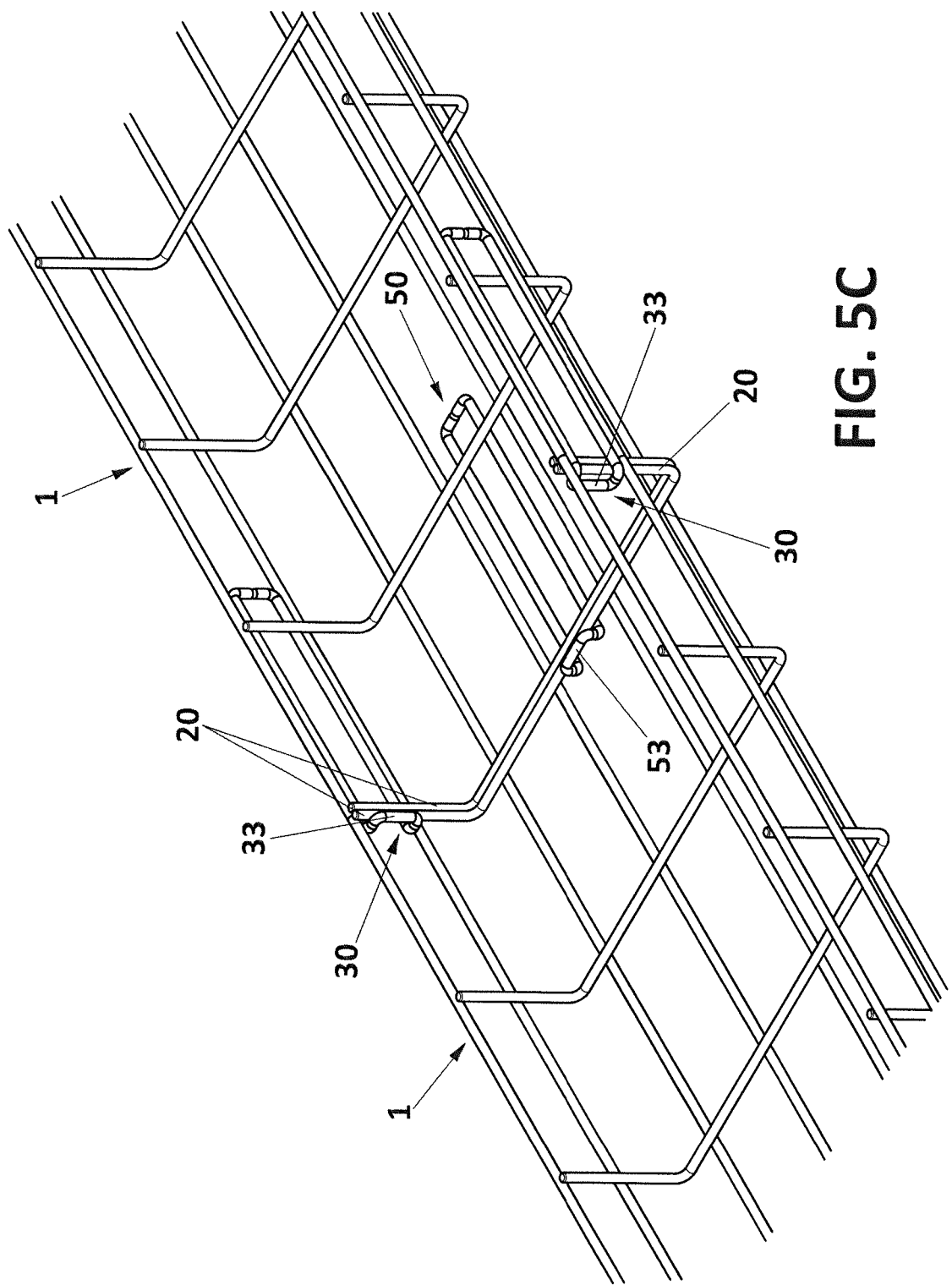

FIGS. 5A to 5C show the simple and comfortable movement to be made to couple two contiguous tray sections (1). It can therefore initially be seen in FIG. 5A that one of the sides of the transverse metal wire (20) of a first tray section (1) (the one located furthest to the left as observed in said FIG. 5A) has been introduced into the free space (40) of a contiguous second tray section (1) (the one located furthest to the right as observed in said FIG. 5A), between the rectangular section (30) and the last transverse metal wire (20). It can clearly be inferred from this FIG. 5A that the installation does not have to be done with any working angle ($\alpha$), as is needed with the current anchoring systems like the one shown in FIG. 1.

Next, FIG. 5B shows the moment in which the other side of the transverse metal wire (20) of the first tray section (1) is being introduced into the corresponding free space (40) of the second tray section (1). To that end, all that is left is to impart slight downward vertical pressure, thereby achieving, due to certain flexibility of the transverse metal wire (20), an integral coupling between same, such that the first transverse wire (20) of the first tray section (1) are in direct contact with the last transverse wire (20) of the second tray section (1), as seen in FIG. 5C.

In this case, said coupling between the two tray sections (1) is furthermore completed by means of the additional anchoring element (50) and its corresponding rectangular section (53), assuring perfect coupling, also in the lower horizontal region of the tray sections (1), as seen in FIG. 5C. Here it should be pointed out that with the anchoring system herein described, the widths and heights of the ends of the tray sections are identical, i.e., there is no tapering or widening of the ends thereof, as occurs in some systems today, which results in a simpler and more direct manufacture, reducing the associated economic costs.

Therefore, by means of the tray section herein described, the formation and installation of electrical cable support ducts is favored through a comfortable, quick and simple assembly, being suitable for places where there is very little space, making it particularly useful and of interest for hard-to-reach places, where it is almost impossible for the installation operator to work or make movements with his/her arms.

The invention claimed is:

1. Cable tray section (1) comprising longitudinal metal wires (10); U-shaped transverse metal wires (20) attached to the longitudinal metal wires (10); at least one anchoring element (30) installed between the longitudinal metal wires (10), on the same vertical plane as the side walls of the tray section (1); where said anchoring element (30) is attached to the last and next to last transverse metal wires (20) and comprises a single metal wire (31) close to the next to last transverse metal wire (20); and a pair of straight sections (32, 32') parallel to one another;

wherein the straight sections (32, 32') of the anchoring element (30) project outwardly with respect to the last transverse metal wire (20) of the tray section (1), characterized in that:

the projection outwardly of the straight sections (32, 32') forms a rectangular section (33) perpendicular to the straight sections (32, 32'), such that there is established a free space (40) between the last transverse metal wire (20) and said rectangular section (33);

wherein said space (40) has a dimension corresponding to the thickness of a transverse metal wire (20) of the tray section (1);

and wherein the metal wire (31) of the anchoring element (30) is bent into a completely closed configuration at both its proximal end and distal end, said proximal end being understood as the end closest to the last transverse metal wire (20), and distal end being understood as the end of the anchoring element (30) closest to the next to last transverse metal wire (20).

2. Cable tray section (1) according to claim 1, characterized in that the rectangular sections (33) of the side walls of the tray section (1) are opposite one another, arranged symmetrically with respect to the longitudinal axis (A-A') of the tray section (1).

3. Cable tray section (1) according to claim 1, characterized in that it additionally comprises at least one additional anchoring element (50), located on the horizontal plane of the lower wall of the tray section (1), and attached to the last and next to last transverse metal wires (20).

4. Cable tray section (1) according to claim 3, characterized in that the additional anchoring element (50) is installed on the longitudinal axis of symmetry (A-A) of the tray section (1).

5. Cable tray section (1) according to claim 3, characterized in that it comprises two additional anchoring elements (50), installed equidistantly with respect to the longitudinal axis of symmetry (A-A) of the tray section (1).

6. Cable tray section (1) according to claim 3, characterized in that the additional anchoring element/elements (50) is/are structurally similar to the anchoring elements (30) of the side walls of the tray section (1), said additional anchoring element (50) comprising a single metal wire (51) close to the next to last transverse metal wire (20), and a pair of straight sections (52, 52') parallel to one another;

where the straight sections (52, 52') of the additional anchoring element (50) project with respect to the last transverse metal wire (20) of the tray section (1), forming a rectangular section (53) perpendicular to said straight sections (52, 52'), such that there is established a free space (40) located between the last transverse metal wire (20) and said rectangular section (53);

and where said space (40) has a dimension corresponding to the thickness of a transverse metal wire (20) of the tray section (1).

7. Cable tray section (1) according to claim 1, characterized in that the metal wire (51) is bent into a completely closed configuration at both its proximal end and distal end.

* * * * *